(12) United States Patent
Braun et al.

(10) Patent No.: US 8,954,926 B2
(45) Date of Patent: Feb. 10, 2015

(54) CODE COVERAGE DETECTION WITH SCRIPTABLE LANGUAGE UNMODIFIED SOURCE

(75) Inventors: Menachem Braun, Elkana (IL); Ronen Borshack, Ginaton (IL)

(73) Assignee: Microsoft Corporation, Redmond, WA (US)

( * ) Notice: Subject to any disclaimer, the term of this patent is extended or adjusted under 35 U.S.C. 154(b) by 347 days.

(21) Appl. No.: 13/411,672

(22) Filed: Mar. 5, 2012

(65) Prior Publication Data

US 2013/0232473 A1    Sep. 5, 2013

(51) Int. Cl.
*G06F 9/44*    (2006.01)

(52) U.S. Cl.
USPC .......................................... 717/115; 717/124

(58) Field of Classification Search
USPC .................................. 717/115, 124, 128–130
See application file for complete search history.

(56) References Cited

U.S. PATENT DOCUMENTS

| | | | | |
|---|---|---|---|---|
| 6,161,216 | A * | 12/2000 | Shagam | 717/128 |
| 7,721,265 | B1 * | 5/2010 | Xu et al. | 717/127 |
| 2006/0195724 | A1 * | 8/2006 | Filho | 714/35 |
| 2006/0294503 | A1 * | 12/2006 | Henderson et al. | 717/131 |
| 2007/0006166 | A1 | 1/2007 | Daley | |
| 2008/0307391 | A1 * | 12/2008 | Goel | 717/115 |
| 2009/0125976 | A1 | 5/2009 | Wassermann et al. | |
| 2009/0132359 | A1 | 5/2009 | Borshack | |
| 2010/0082843 | A1 * | 4/2010 | Lu et al. | 710/10 |
| 2010/0153939 | A1 | 6/2010 | Stall et al. | |
| 2012/0167055 | A1 * | 6/2012 | Yokoi | 717/126 |

OTHER PUBLICATIONS

"Devel::Cover—Code Coverage Metrics for Perl", Retrieved at <<http://search.cpan.org/~pjcj/Devel-Cover-0.79/lib/Devel/Cover.pm>>, Retrieved Date: Dec. 23, 2011, pp. 6.
Kamenskaya, Ekaterina, "Scriptcover makes Javascript Coverage Analysis Easy", Retrieved at <<http:// googletesting.blogspot.com/2011/10/scriptcover-makes-javascript-coverage.html>>, Oct. 25, 2011, pp. 3.
"Active Scripting", Retrieved at <<http://en.wikipedia.org/wiki/Active_Scripting>>, Jan. 14, 2012, pp. 3.
"Code coverage", Retrieved at <<http://en.wikipedia.org/wiki/Code_coverage>>, Feb. 16, 2012, pp. 6.
(Continued)

*Primary Examiner* — Anna Deng
(74) *Attorney, Agent, or Firm* — Kate Drakos; Micky Minhas

(57) ABSTRACT

Code coverage detection for interpreted scriptable programming languages avoids source code modification. Each program element of the script is performed by (a) using a debugger to proactively computationally indicate in a coverage data structure that the element was reached, and integrally (b) running non-logger executable code which corresponds to the element. Coverage of lines, statements, and other program elements during script execution can be measured even though the source code has not been instrumented with injected log statements. Proactively generated breakpoints pass control from each coverage-tracked program element into a code coverage debugger which updates the coverage data structure. Comments are skipped. Code coverage detection may be invoked from a command line, an Integrated Development Environment, or another context. The coverage data structure is correlated with the source code to produce a coverage map that is displayed to users showing which source code was performed.

20 Claims, 3 Drawing Sheets

(56) References Cited

OTHER PUBLICATIONS

"Scripting language", Retrieved at <<http://en.wikipedia.org/wiki/Scripting_language>>, Feb. 10, 2012, pp. 4.

"VBScript", Retrieved at <<http://en.wikipedia.org/wik/VBScript>>, Feb. 13, 2012, pp. 7.

"Windows Script Host", Retrieved at <<http://en.wikipedia.org/wiki/Windows_Script_Host>>, Feb. 10, 2012, pp. 4.

* cited by examiner

CODE COVERAGE DETECTION WITH SCRIPTABLE LANGUAGE UNMODIFIED SOURCE

BACKGROUND

Software tests are sometimes meant to exercise particular portions of a target program, and sometimes they are meant to exercise most or even all portions of the target. Either way, it is often helpful to have an automatically created report that describes which portion(s) of the target were actually executed during the test(s). Such a report is called a "code coverage" report. A code coverage report may be part of a profile of the target, although "profile" sometimes refers instead or in addition to other measures such as those measuring computational and memory resources consumed during a test.

To assist program development, code coverage reports are often given in terms of source code. For example, a code coverage report may specify which program elements of a target's source code were reached during testing. Code coverage may be reported in terms of program elements such as which functions or other routines were called, which statements were executed, which flow control paths were followed, which conditional expressions were evaluated, and/or which lines of source code were reached. It is understood that these program elements are interrelated and overlap one another in some ways, e.g., a line of source may contain part of a statement, a complete statement, or several statements. Similarly, knowing that particular statement(s) or lines within a conditional flow statement were executed often specifies as well which flow control paths were followed and to some extent which conditional expressions were evaluated.

SUMMARY

Code coverage for interpreted programs, such as programs written in scriptable programming languages, has often involved source code modification. Source code is instrumented (and thus modified) by injecting log statements into the code being tested. Such instrumentation may be disruptive to program development, resource-intensive, and/or introduce unwanted complexity.

However, some embodiments described herein provide approaches for detecting the extent of script code coverage without requiring modification of script source code. Some embodiments computationally receive in a computer readable storage medium a source code file which contains source code program elements written in a scriptable programming language. Some of the many such programming languages, for example, are BASIC, JavaScript® (mark of Oracle America, Inc.), JScript® (mark of Microsoft Corporation), Perl® (mark of Yet Another Society DBA The Perl Foundation), PerlScript® (mark of ActiveState Software Inc.), PHP, Python® (mark of Python Software Foundation Corporation), REXX, Ruby® (mark of Ralph Ruby, Jr.), Tcl, VBScript (mark of Microsoft Corporation), and XSLT. Some examples of source code program elements are functions or other routines, statements, flow control paths, conditional expressions, and lines of source code.

After determining that script code coverage detection is enabled, some embodiments "perform" a program element of the source code by (a) using a debugger to proactively computationally indicate in a coverage data structure that the program element has been reached during performance of the source code, and (b) running non-logger executable code which corresponds to the program element. Operations (a) and (b) are integral to one another in that neither operation occurs without the other while script code coverage detection is enabled. In general, multiple program elements of the source code are thus performed. The coverage data structure may be, for example, a Boolean bit vector in which each bit represents a line of source code. Each bit is set/clear according to whether the corresponding line of source has/hasn't been reached during an execution (strictly speaking, an interpretation, some might say) of the source code program.

Although some embodiments allow use of injected log statements or other instrumentation that modifies the source code to facilitate testing, such modifications are not required. The source code file can be devoid of code injected into the script to track which program elements were executed, and need not be instrumented with log statements because a different mechanism (involving debugger breakpoints) is used to detect the extent of code coverage.

In some embodiments, using a debugger when performing a program element involves hitting a proactively generated breakpoint. Unlike user-specified breakpoints, which are set manually by users, proactively generated breakpoints are generated proactively, without a specific detailed user request. The proactive breakpoints to make the flow of control pass from each coverage-tracked program element into a code coverage debugger that updates the code coverage data structure to keep track of which program elements have been reached. Unlike some familiar script logging approaches, use of proactively generated breakpoints does not require instrumenting the source code with log statements. The code coverage debugger is sometimes referred to herein as a custom debugger, since it is designed for code coverage detection as opposed to typical debugging activities such as reading and writing user-defined variables during controlled execution (i.e., interpretation) of a program.

It is understood that source code sometimes contains comments and other program elements which do not have corresponding executable code during normal script runs outside the testing context, e.g., when script code coverage detection is disabled. Some embodiments identify in the source code a comment or other such portion which has no corresponding non-logger executable code when script code coverage detection is disabled, and then skip that portion instead of performing it as a program element. Thus, in these embodiments comments are not considered to be code, at least not for the purpose of detecting the extent of code coverage.

Code coverage detection may be invoked from a command line, such as an operating system command interpreter, in some embodiments. In some, code coverage detection may be invoked from within an Integrated Development Environment (IDE) such as an appropriately equipped version of a Microsoft® Visual Studio® environment (marks of Microsoft Corporation). Many IDEs provide a graphical user interface (GUI). In some embodiments, code coverage detection may also be invoked from within other GUIs, such as the GUI of a standalone profiler tool.

In some embodiments, the coverage data structure is correlated with the source code file to produce a script code coverage map that specifies which program elements of the source code were performed. The script code coverage map can be displayed to users and/or otherwise utilized during testing. In the display, a user may be shown lines of source code which were performed, in conjunction with an indication that those lines were performed. Alternately, or in addition, the user may be shown lines of source code which were not performed, in conjunction with an indication that those lines were not performed.

From an architectural perspective, some embodiments include a logical processor and a memory in operable communication with the logical processor. The memory may be volatile (e.g., RAM) and/or persistent (e.g., hard disk) memory. Multiple program statements of source code written in a scriptable programming language reside in the memory. A script host interface also resides in the memory. The script host has debugger engine code which, upon execution by the processor, creates a debugger session for the source code. The code may include a suitably equipped version of cscript.exe or another script execution engine, for example. Proactively generated code coverage breakpoints in the memory are associated with program elements (e.g., lines or statements) of the source code. A code coverage data structure, e.g., a bit vector, also resides in the memory. A custom debugger residing in the memory has custom debugger code which receives control in response to the debugger session encountering any of the code coverage breakpoints, updates the code coverage data structure according to the program statements(s) associated with the encountered code coverage breakpoint, and returns control to the debugger engine code.

Some embodiments include display code that shows in a graphical user interface which source code program elements were executed (i.e., interpreted) and which elements were not. A proactively generated code coverage breakpoint may be associated with a single program statement of the source code, with multiple statements, with particular program elements such as routine entry points, and/or with other selected program elements.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
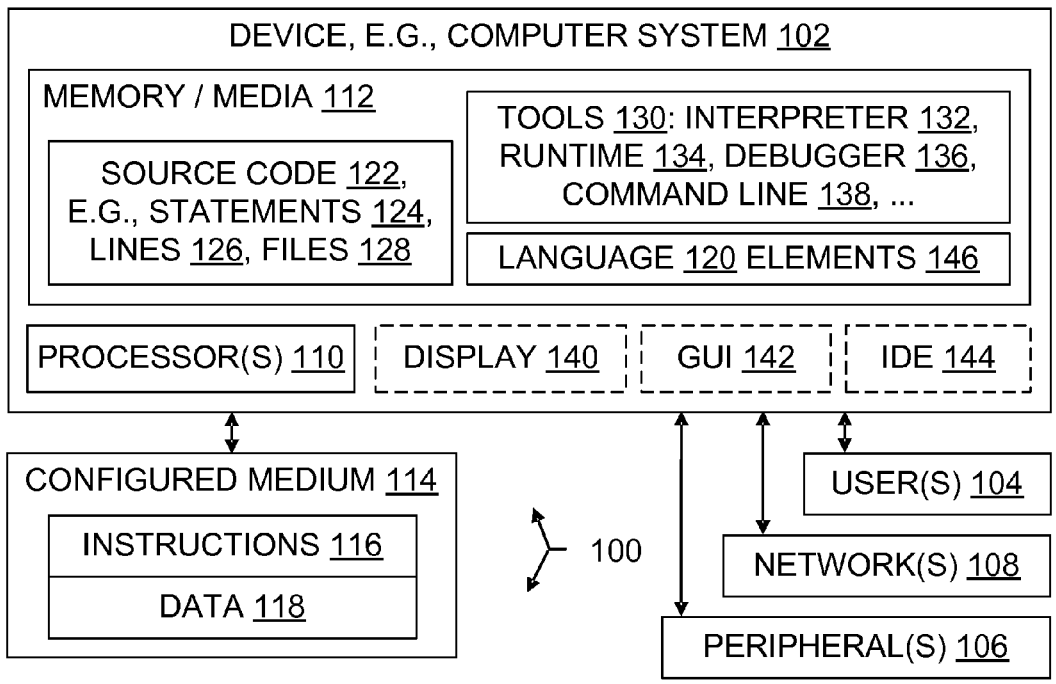
FIG. 1 is a block diagram illustrating a computer system having at least one processor, at least one memory, at least one interpreter for executing scriptable language programs, and other items in an operating environment which may be present on multiple network nodes, and also illustrating configured storage medium embodiments.

As part of the verification process and testing of programming code, a developer and/or tester of the code is often interested in getting code coverage metrics. The user in question may want to know, for example, which lines of code were executed by the program and which were not. Code coverage functionality is widely available for compiled languages such as C++, but code coverage tools for scriptable languages like VBScript have been inadequate.

Some embodiments described herein help measure code coverage for scripted programming languages, both VBScript and others. In one embodiment, Windows Script Host cscript.exe is modified and extended to log every line of source code the script engine executes. A custom made debugger added to the familiar script engine causes a script break (artificial breakpoint) upon program initialization and successively thereafter. The debugger handles each breakpoint, saves the current line of code and continues execution of the script. When the script is finished, the script host saves an execution log in the form of a mapping of lines of program code and whether they were executed or not.

Some embodiments utilize a parsing and logging algorithm for VBScript code, based on familiar parsing technology and breakpoint-based logging as described herein. Some provide measurement logic for detecting the extent of code coverage for VBScript code and other interpreted source code. Some include cscript.exe modifications to support scripted language profiling. Unlike approaches which work by instrumenting the source code, approaches provided here do not rely on changes in the source code to track which portions have been reached during testing.

Some embodiments described herein may be viewed in a broader context. For instance, concepts such as source code, interpreters, logs, debuggers, breakpoints, program elements, and comments may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and methods involving source code, interpreters, logs, debuggers, breakpoints, program elements, and/or comments are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

Scriptable programming languages are interpreted (as opposed to compiled) languages, so "execution" in reference to their source code means that an interpreter executes code which corresponds to that source code. As noted expressly in the claims, "performing" a piece of the source code involves such execution (which also occurs normally in familiar source code interpreters) and integrally with that execution also using the breakpoint mechanism to log the execution as part of the code coverage detection. "Integrally" does not impose an order—the execution may occur before the coverage logging, or after it, or they may overlap, but in any case they both complete before performance of the next piece of source code on the logical processor in question.

"Process" is sometimes used herein as a term of the computing science arts, and in that sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Those of skill will understand which meaning is intended in a particular instance, and will also understand that a given claimed process (in the patent law sense) may be implemented using one or more processes (in the computing science sense).

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise beyond the scope of human performance alone. "Computational steps" are steps performed computationally. Neither "automatically" nor "computationally" necessarily means "immediately".

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "line(s)" means "one or more lines" or equivalently "at least one line".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as associating, containing, correlating, corresponding, covering, creating, detecting, determining, disabling, displaying, enabling, executing, generating, hitting, identifying, indicating, injecting, instrumenting, interpreting, invoking, logging, occurring, operating, passing, performing, producing, reaching, reading, receiving, repeating, residing, returning, running, showing, tracking, updating, using, writing (and associates, associated, contains, contained, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a transitory signal on a wire, for example. No claim covers a signal per se.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. System administrators, developers, testers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, and/or optical media, as opposed to merely a signal. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other memory storage devices which are not readily removable by users 104. Neither a computer-readable medium nor a computer-readable memory includes a signal per se.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other operations.

Scriptable language 120 source code 122 having statements 124, lines 126, and other elements 146 (in files 128 or otherwise stored in memory 112), and tools 130 such as an interpreter 132, runtime 134, debugger 136, command line 138 (a.k.a. command line interpreter), other software, and other items shown in the Figures and/or discussed in the text, may each reside partially or entirely within one or more media 112, thereby configuring those media. In addition to display(s) 140, an operating environment may also include other hardware, such as buses, power supplies, wired and wireless network interface cards, and accelerators, for instance.

A given operating environment 100 may include one or more graphical user interfaces 142, such as tool GUIs. In particular, environment 100 may include a GUI as part of an Integrated Development Environment (IDE) 144 which provides a developer with a set of coordinated software development tools 130 such as compilers, source code editors, profilers, debuggers, and so on. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with endeavors outside the field of software development per se.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
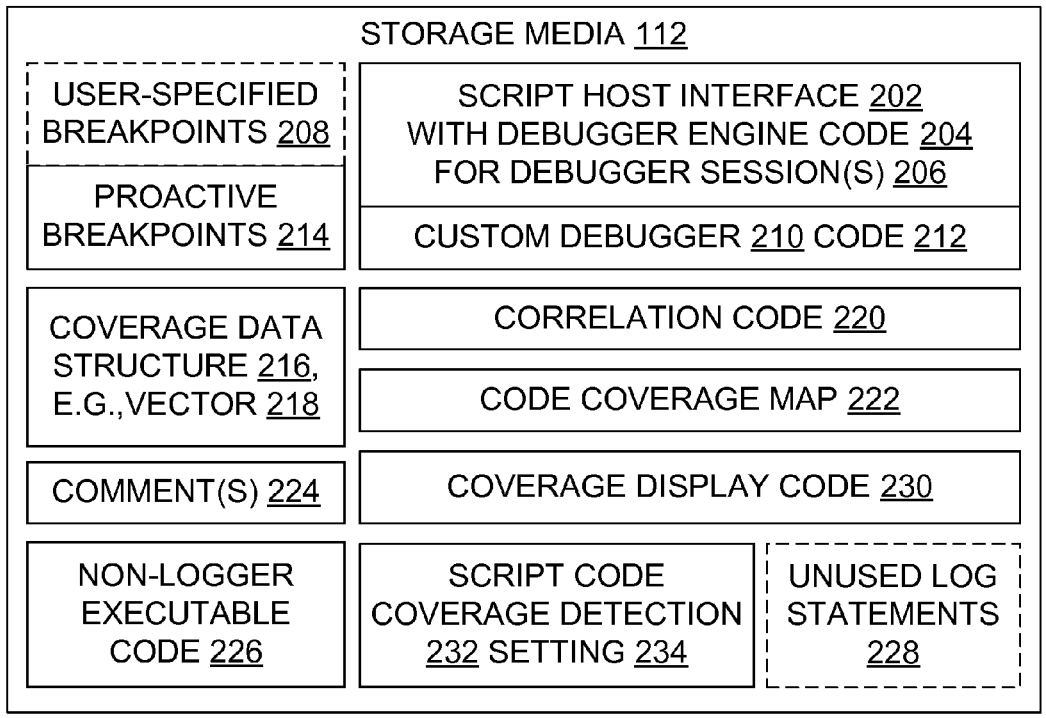
FIG. 2 is a block diagram illustrating aspects of code coverage detection with scriptable language unmodified source code in an example architecture.

FIG. 2 illustrates an architecture which is suitable for use with some embodiments. A script host interface 202 has implementing debugger engine code 204 for creating debugger sessions 206, e.g., sessions using familiar user-specified breakpoints 208 and/or familiar application debugging techniques. A custom debugger 210 designed specifically for script code coverage detection is also present, including code 212 for generating and using proactive breakpoints 214 to update a coverage data structure 216 (e.g., a bit vector 218) along the way as source code 122 is interpreted. Correlation code 220 correlates information from the coverage data structure 216 with the source code 122 to produce a code coverage map 222 that identifies which parts of the source code 122 were reached by the interpreter 132.

In some embodiments, parts of the source code that are essentially ignored by the interpreter, such as comments 224 that are stripped out or skipped over instead of being executed by the interpreter, are not necessarily represented in the coverage data structure 216. By contrast, parts of the source that have non-logger executable code 226 (i.e., the "meat" or substance of the source code that is being tested) are represented in the coverage data structure 216 and thus in the code coverage map 222. Because proactive breakpoints 214 are used, the source code 122 need not be modified by insertion of logger statements 228, print statements, or other logger executable code. Coverage display code 230 displays information from the coverage map, in an IDE 144 for example.

Usage of proactive breakpoints 214 and of the other code coverage detection 232 tools and techniques described here is controlled in some embodiments by setting(s) 234. For example, a simple toggle setting may turn on/turn off code coverage detection 232, with a granularity selection hardcoded. The granularity specifies whether to log lines, statements, routine calls, and/or other program elements 146. Alternately, a user-controlled granularity setting 234 may specify overall the computational proactive placement of individual breakpoints 214 on program elements 146 in the source code 122. In some embodiments during completion of processing a current breakpoint, the application being debugged is directed to resume from the breakpoint using a "step into" action which continues execution to the next line of code, and in particular steps into (enters) functions and procedures if they are called in current line of code. Some embodiments proactively put breakpoints throughout the source code, e.g., on at least 50% of the statements, or at least 75%, or at least 90%, or at least 95% of the statements, or at least some other measurable threshold, and some put proactive breakpoints on every statement in the code whose coverage is being tested.

Figure 3:
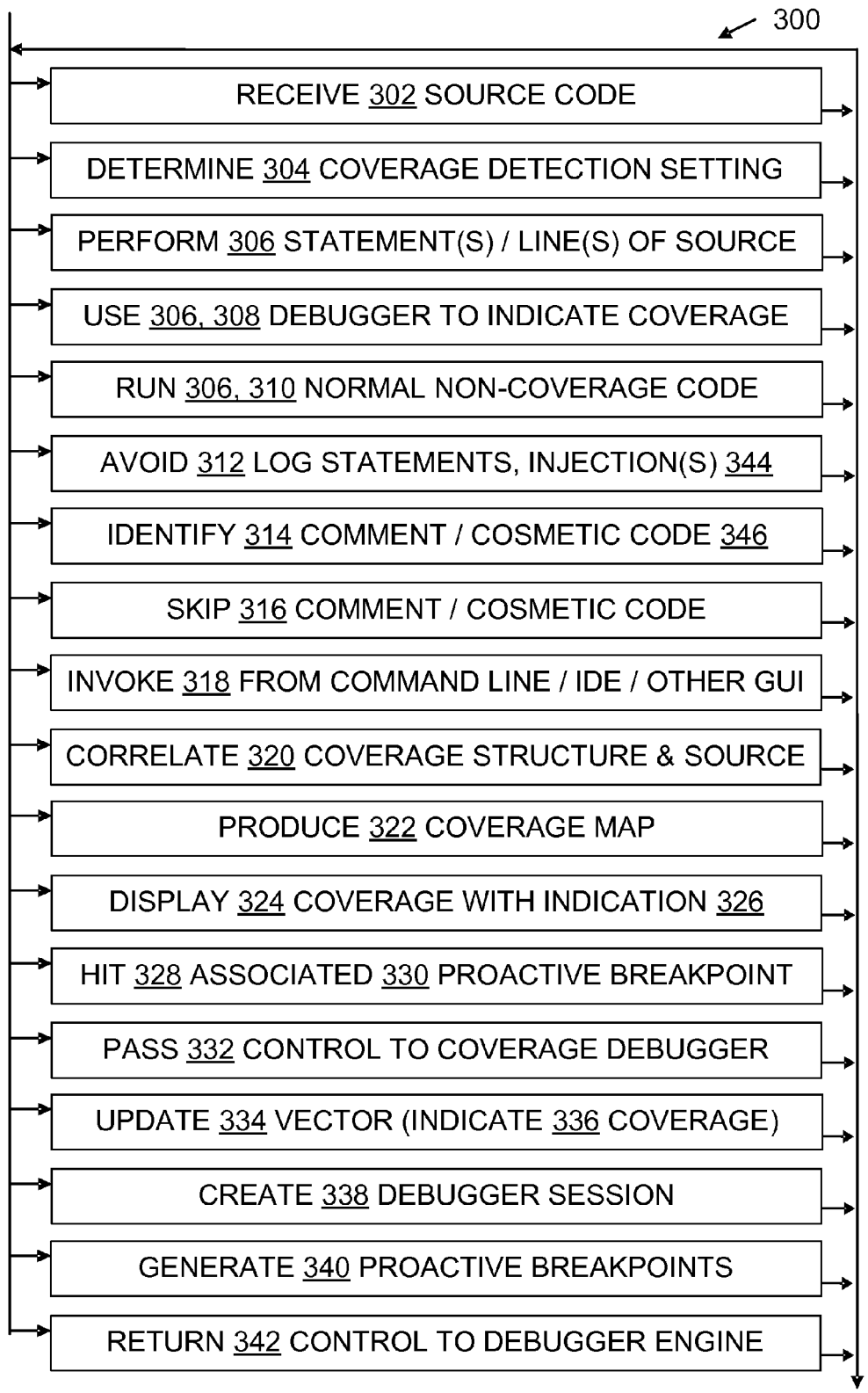
FIG. 3 is a flow chart illustrating steps of some process and configured storage medium embodiments.

With reference to FIGS. 1 through 3, some embodiments provide a computer system 102 with a logical processor 110 and a memory medium 112 configured by circuitry, firmware, and/or software to transform interpreted source code but not the underlying human readable source code by proactive breakpoint-based code coverage detection as described herein.

Some embodiments include a logical processor 110 and a memory 112 in operable communication with the logical processor. The memory 112 may be volatile (e.g., RAM) and/or persistent (e.g., hard disk) memory. Multiple program statements 124 and/or other program elements 146 of source code 122 written in a scriptable programming language 120 reside in the memory. A script host interface 202 (a.k.a. script host) also resides in the memory. The script host 202 has debugger engine code 204 which, upon execution by the processor, creates a debugger session 206 for the source code 122. The code 204 may include a suitably equipped version of cscript.exe, for example. Proactively generated code coverage breakpoints 214 in the memory 112 are associated with program elements 146 (e.g., lines or statements) of the source code.

In some embodiments, a code coverage data structure 216 also resides in the memory 112. The coverage data structure may be, for example, a Boolean bit vector 218 in which each bit represents a line of source code. Each bit is set/clear according to whether the corresponding line or other program element 146 of source has/hasn't been reached during an execution (strictly speaking, an interpretation, some might say) of the source code program. Other structures 216 may also be used, e.g., other vectors or tuples, or lists, for example.

In some embodiments, a custom debugger 210 residing in the memory has custom debugger code 212 which receives control in response to the debugger session encountering any of the code coverage breakpoints 214, updates the code coverage data structure 216 according to the program statements (s) or other program elements 146 associated with the encountered code coverage breakpoint, and returns control to the debugger engine code 204.

Some embodiments include display code 230 that shows in a graphical user interface 142 which source code program elements were executed (i.e., interpreted) and which elements 146 were not. A proactively generated code coverage breakpoint 214 may be associated with a single program statement 124 of the source code, with multiple statements, with particular program elements 146 such as routine entry points, and/or with other selected program elements.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, source code 122 may be on multiple devices/systems 102 in a networked cloud, code coverage maps 222 may be stored on yet other devices within the cloud, and the display code 230 may configure the display on yet other cloud device(s)/system(s) 102.

Processes

FIG. 3 illustrates some process embodiments in a flowchart 300. Processes shown in the Figures may be performed in some embodiments automatically, e.g., by a script host 202 and custom debugger running in response to a script or requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

Some embodiments computationally receive 302 in a computer readable storage medium a source code file 128 which contains source code program elements 146 written in a scriptable programming language 120, such as JavaScript® (mark of Oracle America, Inc.), JScript® (mark of Microsoft Corporation), Perl® (mark of Yet Another Society DBA The Perl Foundation), PerlScript® (mark of ActiveState Software Inc.), PHP, Python® (mark of Python Software Foundation Corporation), Ruby® (mark of Ralph Ruby, Jr.), or VBScript (mark of Microsoft Corporation), to name a few. In some embodiments, source code program elements 146 are functions or other routines. In some they are statements 124, and in some they are lines 126 of source code.

A setting 234 may specify that script code coverage detection 232 is enabled, or script code coverage detection 232 may be inherently enabled by virtue of the environment 100 being configured as a test environment, for example. After determining 304 that script code coverage detection is enabled, some embodiments "perform" 306 a program element 146 of the source code. In some embodiments, performing step 306 includes (a) using 308 a debugger to proactively computationally indicate in a coverage data structure 216 that the program element has been reached during performance of the source code, and (b) running 310 non-logger executable code 226 which corresponds to the program element. Operations (a) and (b) are integral to one another in that neither operation occurs without the other while script code coverage detection 232 is enabled. In general, multiple program elements of the source code are thus performed 306. That is, performing step 306 is repeated as flow of control proceeds through the source code 122 that is being tested.

Although some embodiments allow use of injected log statements 228 or other instrumentation that modifies the source code 122 to facilitate testing, such modifications are not required for logging or otherwise detecting code coverage with these embodiments. The source code 122 can be devoid of code injected into it to track which program elements 146 were executed. Unlike other approaches, the source code 122 need not be instrumented with log statements 228 because a different mechanism (involving debugger breakpoints 214) is used to detect the extent of code coverage. Log statements 228 and other logger code injections 344 can therefore be avoided 312.

In some embodiments, using debugger code 204 when performing 306 a program element 146 involves hitting 328 a proactively generated breakpoint 214. Proactive breakpoints 214 may be implemented with the same assembly language instructions or other low-level language features for flow control that are used by user-specified breakpoints 208. However, unlike user-specified breakpoints 208 which are set manually by users, proactively generated breakpoints 214 are generated 340 proactively, without a specific detailed user request for the individual breakpoint 214 and they pass 332 control to the code coverage debugger 210 rather than passing it to familiar debugger code. That is, the proactive breakpoints make the flow of control pass 332 from each coverage-tracked program element 146 into the code coverage debugger, which updates 334 the code coverage data structure to indicate 336 the program elements that have been reached.

The code coverage debugger 210 is sometimes referred to herein as a custom debugger 210, since it is designed for code coverage detection 232 as opposed to typical debugging activities such as inspecting the values of program variables during controlled execution (i.e., interpretation) of a program. Unlike some familiar script logging approaches, the code coverage debugger 210 and proactively generated breakpoints 214 do not require instrumenting the source code 122 with log statements.

Source code 122 sometimes contains comments 224 and/or other program portions 346 which do not have corresponding executable code during normal script runs outside the testing context, namely, when script code coverage detection 232 is disabled. Some embodiments identify 314 in the source code 122 a comment or other such portion 346 which has no corresponding non-logger executable code 226 when script code coverage detection is disabled. The embodiment then skips 316 that portion 346 instead of performing it as a program element. Thus, in these embodiments comments 224 and any similar portions 346 are not considered to be code, at least not for the purpose of detecting the extent of code coverage.

Code coverage detection 232 may be invoked 318 from a command line 138, such as an operating system command interpreter, in some embodiments. In some embodiments, code coverage detection 232 may be invoked 318 from within an Integrated Development Environment (IDE) 144 such as an appropriately equipped version of a Microsoft® Visual Studio® environment (marks of Microsoft Corporation). Many IDEs 144 provide a graphical user interface (GUI) 142 which could be enhanced to control settings 234, for example. In some embodiments, code coverage detection 232 may be invoked 318 from within other GUIs, such as the GUI of a standalone profiler tool 130.

In some embodiments, the coverage data structure 216 is correlated 320 with the source code 122 to produce 322 a script code coverage map 222 that specifies which program elements 146 of the source code were performed 306. The script code coverage map 222 can be displayed 324 to users 104 and/or otherwise utilized during testing. In the display, a user may be shown lines of source code which were performed, in conjunction with an indication 326 that those lines were performed, e.g., a dialog stating that all lines shown were executed, or graphics highlighting the lines that were performed. Alternately, or in addition, the user may be shown lines of source code which were not performed, in conjunction with an indication 326 (text dialog, red highlighting, etc.) that those lines were not performed.

In some embodiments, proactively generated code coverage breakpoints 214 in the memory 112 are associated 330 with program elements 146 of the source code, e.g., by virtue of adding breakpoints 214 to the pseudo-code or executable code that corresponds to the source code. The custom debugger 210 receives control in response to the created 338 debugger session encountering any of the code coverage breakpoints 214, updates 334 the code coverage data structure according to the program statements(s) 124 associated with the encountered code coverage breakpoint, and returns 342 control to the debugger engine code. A proactively generated 340 code coverage breakpoint 214 may be associated with a single program statement of the source code, with multiple statements, with particular program elements such as routine entry points, and/or with other selected program elements.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to propagated signal media). The storage medium which is configured may be in particular a removable storage medium 114 such as a CD, DVD, or flash memory. A general-purpose memory, which may be removable or not, and may be volatile or not, can be configured into an embodiment using items such as a code coverage debugger 210, proactive breakpoints 214, correlation code 220, and/or a coverage data structure 216, in the form of data 118 and instructions 116, read from a removable medium 114 and/or another source such as a network connection, to form a configured medium. The configured medium 112 is capable of causing a computer system to perform process steps for transforming source code through coverage detection 232 and display 324 as disclosed herein. FIGS. 1 through 4 thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

In some embodiments, code coverage detection includes two phases. A first phase runs the script 122 and captures the coverage data, while a second phase observes which lines were executed.

Phase 1—Run the Script

To measure the code coverage of scripted languages 120, some embodiments use a modified CScript.exe which includes a custom debugger 210 that will be called on each executed line to log that line number. In some embodiments, a custom debugger 210 (called Code Coverage Debugger), which is a COM class is created. This custom debugger 210 implements familiar Active Scripting interfaces IApplicationDebugger and IDebugSessionProvider, and also implements a custom ICodeCoverageDebugger interface. The custom debugger 210 class implements a debugger that is attached to the running script; upon each breakpoint hit 328 it saves the current line number.

Figure 4:
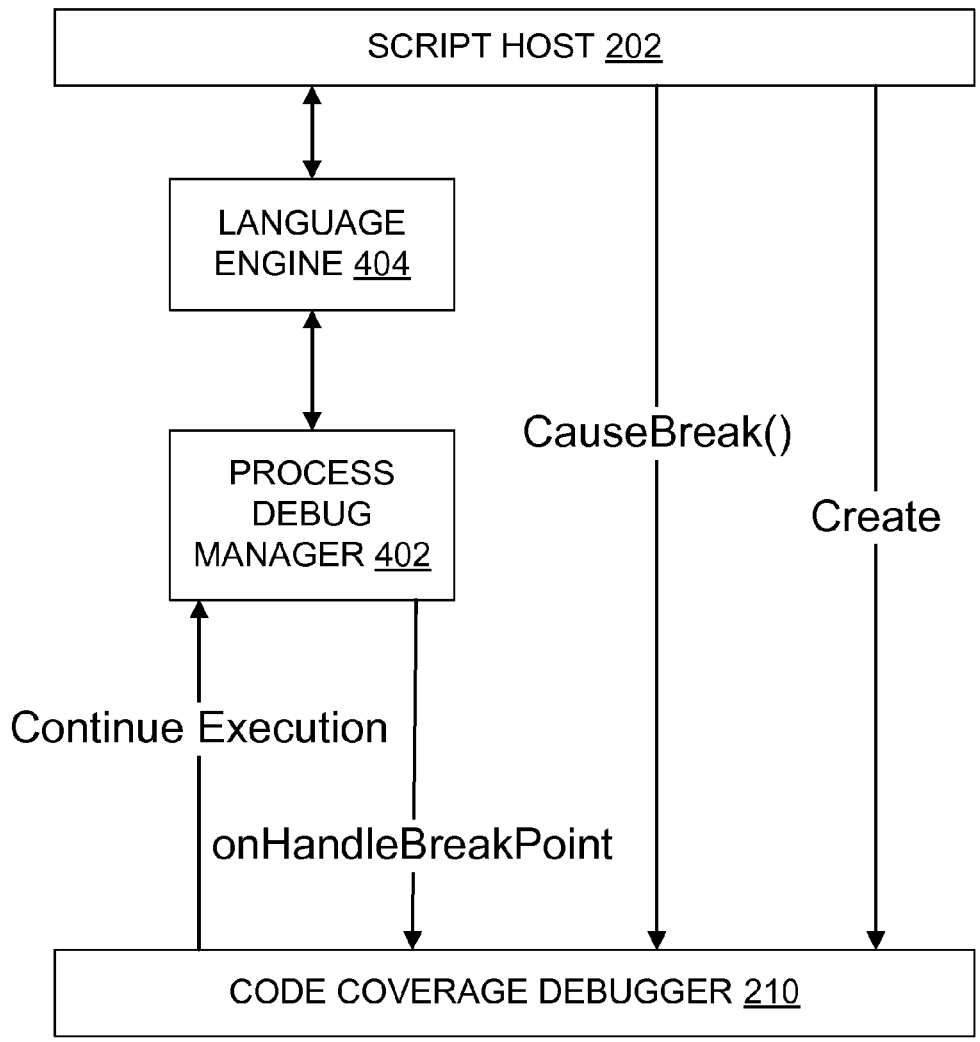
FIG. 4 is a diagram illustrating components and control flow in another example architecture.

As illustrated in FIG. 4, this is done in some embodiments by overriding the method on HandleBreakPoint, which is called from a process debug manager 402 whenever the running script hits a breakpoint 214. Then the debugger queries the script thread context and gets the current execution line number. The debugger 210 saves 334 the fact that that this line was executed, in a vector 218 of Booleans where each bit or other cell corresponds to a line of script 122. Then the embodiment continues the script's execution by calling the GetApplication method of the IRemoteDebugApplicationThread interface to get the application instance, which allows it to call ResumeFromBreakPoint with the BREAKRESUMEACTION_STEP_INTO constant to step into the next line of code via a language engine 404, without skipping any code path. This debugger 210 class is initiated upon CScript's initialization by calling a static Create method. The instance is saved in a member variable, to be used after the script finishes its run.

After this set up for script execution is in place, the script engine 202 starts to run the script and the debugger 210 steps into all lines of code 122 and saves in its vector 218 of Booleans the lines of code that were executed. When the script finishes running, the embodiment creates an empty textual file 222 and queries the custom debugger instance for the executed lines of code. Then it writes the data 218 to that file 222 and the execution of CScript ends.

Phase 2—Observe which Lines were Executed

In order to help developers dig into the details of a specific script execution, a correlation tool 220 will get as input two files: the script file 128 and the output file 222 that CScript.exe created with the code coverage structure 216. The tool will parse the script code to locate statements 124 that span multiple lines, and will show 324 in a graphical user interface 142 which lines 126 were executed and which were not.

By way of further illustration, some embodiments parse and analyze VBScript (or other scripted code) to find language structure and identify 314 which lines of code 122 should be considered part of the code coverage profiling session and which are not (like comments 224, closing endif statements, and other portions 346). Using a cscript.exe engine as a script parser and executer, some embodiments run a given VBScript script and break 328 into a custom debugger 210 on lines that the engine executes. The debugger 210 is able to mark and record 334 which lines of code 122 were hit by this specific execution and thus log this information for future reporting. At the end of script execution, the data recorded above is measured and/or correlated 320 against the actual script code 122 to measure code coverage effectiveness in this run. Substantive results of the run, as well as a visual display 326 of which lines were executed or not, is displayed 324 in a visual tool such as a suitably enhanced Microsoft® Visual Studio® tool (marks of Microsoft Corporation).

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computational process for detecting script code coverage, the process comprising the computational steps of:
    receiving in a computer readable storage medium a source code file which contains source code program elements written in a scriptable programming language;
    determining that script code coverage detection is enabled;
    performing a program element of the source code by (a) using a debugger to proactively computationally indicate in a coverage data structure that the program element has been reached during performance of the source code, and (b) running non-logger executable code which corresponds to the program element, with operations (a) and (b) integral to one another in that neither operation occurs without the other while script code coverage detection is enabled, wherein said performing comprises an interpreter hitting a proactive breakpoint which is not a user-specified breakpoint and in response to hitting the proactive breakpoint passing control to a code coverage debugger which updates the coverage data structure rather than passing control through to a graphical user interface of the debugger for action by a human user; and
    repeating the performing step for multiple program elements of the source code.

2. The computational process of claim 1, wherein the source code file is devoid of code injected into the script to track which program elements were executed and is not instrumented with log statements.

3. The computational process of claim 1, further comprising identifying in the source code a portion which has no corresponding executable code when script code coverage detection is disabled, and then skipping that portion instead of performing it as a program element.

4. The computational process of claim 1, wherein the performing step occurs in response to an invocation of the source code from a command line.

5. The computational process of claim 1, wherein the performing step occurs in response to an invocation of the source code from a graphical user interface.

6. The computational process of claim 1, further comprising correlating the coverage data structure with the source code file, and producing a script code coverage map that specifies which program elements of the source code were performed.

7. The computational process of claim 6, further comprising displaying the script code coverage map.

8. A computer-readable storage medium configured with data and with instructions that when executed by at least one processor causes the processor(s) to perform a process for nondestructively detecting coverage of lines of source code written in a scriptable programming language, the process comprising the computational steps of:
    performing a line of the source code by (a) using a debugger to proactively computationally indicate in a coverage data structure that the line has been reached, and (b) running non-logger executable code which corresponds to source code that is written in the line, with operations (a) and (b) integral to one another in that neither operation occurs without the other for any line of the source code during the process, wherein said performing comprises an interpreter hitting a proactive breakpoint which is not a user-specified breakpoint and in response to hitting the proactive breakpoint passing control to a code coverage debugger which updates the coverage data structure rather than passing control through to a graphical user interface of the debugger for action by a human user;
    repeating the performing step for multiple lines of the source code; and
    identifying in the source code at least one line which has no corresponding non-logger executable code, and then skipping that line instead of performing it.

9. The configured storage medium of claim 8, wherein the identifying step identifies a comment which extends for at least one line in the source code.

10. The configured storage medium of claim 8, wherein the source code includes statements written in at least one of the following scriptable programming languages: BASIC, JavaScript, JScript, Perl, PerlScript, PHP, Python, REXX, Ruby, Tcl, VBScript, XSLT.

11. The configured storage medium of claim 8, wherein the process further comprises displaying a script code coverage map that specifies which program elements of the source code were performed.

12. The configured storage medium of claim 8, wherein using a debugger comprises updating a Boolean vector which represents lines of source code reached.

13. The configured storage medium of claim 8, wherein the source code is devoid of code coverage log statements.

14. The configured storage medium of claim 8, wherein the process further comprises correlating the coverage data structure with the source code file.

15. The configured storage medium of claim 8, further comprising displaying lines of source code which were performed, in conjunction with displaying an indication that those lines were performed.

16. A computer system comprising:
    a logical processor;
    a memory in operable communication with the logical processor;
    multiple program statements of source code written in a scriptable programming language and residing in the memory;
    a script host interface residing in the memory and having implementing debugger engine code residing in the memory which upon execution by the processor creates a debugger session for the source code;
    a code coverage data structure residing in the memory; and
    a custom debugger code residing in the memory which upon execution by the logical processor performs a program element of the source code by (a) using a debugger to proactively computationally indicate in the coverage data structure that the program element has been reached during performance of the source code, and (b) runs non-logger executable code which corresponds to the program element, with operations (a) and (b) integral to one another in that neither operation occurs without the other while a script code coverage detection is enabled, wherein said performing of a program element of the source code includes hitting a proactive breakpoint which is not a user-specified breakpoint and in response to hitting the proactive breakpoint passing control to a code coverage debugger which updates the coverage data structure rather than passing control through to a graphical user interface for action by a human user.

17. The system of claim 16, wherein the source code program statements are written in at least one of the following scriptable programming languages: BASIC, JavaScript, JScript, Perl, PerlScript, PHP, Python, REXX, Ruby, Tcl, VBScript, XSLT.

18. The system of claim 16, wherein the debugger comprises cscript.exe code.

19. The system of claim 16, wherein the system comprises display code which upon execution by the logical processor shows in the graphical user interface which source code program statements were executed and which were not executed.

20. The system of claim 16, wherein the system identifies in the source code a portion which has no corresponding executable code when script code coverage detection is disabled, and then skips that portion instead of performing it as a program element.

* * * * *